United States Patent
Miyatake et al.

(10) Patent No.: US 6,424,744 B2
(45) Date of Patent: *Jul. 23, 2002

(54) VIDEO RETRIEVAL METHOD AND APPARATUS

(75) Inventors: Takafumi Miyatake, Hachioji; Shigeo Sumino, Chofu; Katsumi Taniguchi, Hachioji; Akio Nagasaka, Kokubunji; Mitsuru Ikezawa, Kodaira; Hirotada Ueda, Kokubunji, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/771,562

(22) Filed: Jan. 30, 2001

Related U.S. Application Data

(63) Continuation of application No. 09/453,585, filed on Dec. 7, 1999, now Pat. No. 6,192,151, which is a continuation of application No. 08/908,072, filed on Aug. 11, 1997, now Pat. No. 6,021,231, which is a continuation of application No. 08/323,866, filed on Oct. 17, 1994, now Pat. No. 5,805,746.

(30) Foreign Application Priority Data

Oct. 20, 1993 (JP) .............................................. 5-262102

(51) Int. Cl.[7] .............................................. G06K 9/46
(52) U.S. Cl. ........................ 382/190; 382/236; 707/512
(58) Field of Search ................................ 382/190, 305, 382/236; 707/512; 345/723, 853; 348/478

(56) References Cited

U.S. PATENT DOCUMENTS

| | | | |
|---|---|---|---|
| 4,000,510 A | 12/1976 | Cheney et al. | 360/33 |
| 4,305,131 A | 12/1981 | Best | 364/521 |
| 4,517,598 A * | 5/1985 | Van Valkenburg et al. | 348/478 |
| 4,924,303 A | 5/1990 | Brandon et al. | 348/7 |
| 5,014,125 A | 5/1991 | Pocock et al. | 379/105 |
| 5,083,860 A | 1/1992 | Miyatake et al. | 352/129 |
| 5,412,773 A | 5/1995 | Carlucci et al. | 395/156 |
| 5,537,528 A * | 7/1996 | Takahashi et al. | 707/512 |
| 5,600,364 A | 2/1997 | Hendricks et al. | 348/1 |
| 5,805,746 A * | 9/1998 | Miyatake et al. | 382/305 |
| 6,021,231 A * | 2/2000 | Miyatake et al. | 382/305 |
| 6,912,151 * | 2/2001 | Miyatake et al. | 382/190 |

* cited by examiner

Primary Examiner—David Moore
Assistant Examiner—Anh Hong Do
(74) Attorney, Agent, or Firm—Antonelli, Terry, Stout & Kraus, LLP

(57) ABSTRACT

A method of characterizing a video includes the steps of extracting frame images from an input video, calculating a feature of each of the frame images, assigning index information determined by the calculated feature to each of the frame images, stringing together the index information assigned to the frame images, and characterizing the input video by the strung-together index information.

15 Claims, 10 Drawing Sheets

VIDEO RETRIEVAL METHOD AND APPARATUS

CROSS-REFERENCES TO RELATED APPLICATIONS

This application is a continuation of application Ser. No. 09/453,585 filed on Dec. 7, 1999, now U.S. Pat. No. 6,192,151, which is a continuation of application Ser. No. 08/908,072 filed on Aug. 11, 1997, now U.S. Pat. No. 6,021,231, which is a continuation of application Ser. No. 08/323,866 filed on Oct. 17, 1994, now U.S. Pat. No. 5,805,746. The contents of application Ser. Nos. 09/453,585, 08/908,072, and 08/323,866 are incorporated by reference herein in their entirety.

BACKGROUND OF THE INVENTION

The present invention relates to a method and apparatus for retrieving a broadcast video or a video included in a data base, and in particular to a video retrieval method and apparatus capable of retrieving a video at high speed by using a feature of a video as a clue.

In multimedia information processing systems of recent years, it is possible to store various kinds of information such as videos and texts and display them to users. In case they are to be retrieved, however, there is no alternative but to retrieve them by using languages such as keywords. In this case, work for providing keywords is required. The task of providing frames of a video with respective keywords requires much hard labor. Furthermore, since keywords are freely provided by the data base constructor, there is a problem that these keywords become useless in case the viewpoint of the user is different from that of the data base constructor. Furthermore, in case of videos, there is a need for retrieval based upon a feature of an image itself besides a keyword. Retrieval using a feature of an image as a clue needs a technique capable of fast matching a feature of a video including an enormous number of frames with features of its enquiry video. Heretofore, there has never been a matching technique which can be applied to videos. In conventional video retrieval, therefore, there is no practical means except a method in which the user checks and looks for a video with eyes while reproducing videos together with functions of rapid traverse and rewind. Even if videos are digitized and stored to form a data base, therefore, efficient use is impossible. Furthermore, there exists no video retrieval system catching a specific scene out of a video which is being broadcasted.

SUMMARY OF THE INVENTION

An object of the present invention is to provide a video retrieval method, and apparatus, capable of fast matching a feature of a target video with a feature of an enquiry video without conducting work of providing keywords for video retrieval. As for the target video, both a video which is being broadcasted and a video included in a data base should be dealt with.

In order to achieve the above described object, a retrieval method according to the present invention includes the steps of providing a representative frame image specified by a user with a code or a code string as a name thereof, and registering beforehand code strings of a plurality of representative frame images as enquiry video names; inputting a target video; extracting a representative frame image from the video; calculating one feature or a plurality of features from a whole or a part of the frame image; assigning a corresponding code to the feature or each of the features; providing the frame image with the code or a code string arranged in a predetermined order as a name thereof, and producing a video name for the video in a form of a frame name string corresponding to a string of the frames; and matching the enquiry video names with the video name by using the frame name string and outputting a result.

As the representative frame image, a head frame image located at a change of scenes or a frame image inputted at fixed intervals is adopted. The feature is calculated from a digitized area or a time length of a scene change between frames forming a frame string. For the code assignment, a feature is divided into predetermined ranges and a code to be assigned is determined on the basis of which range the feature belongs to. As for codes, codes such as existing alphabetic characters or Chinese characters are assigned. Furthermore, if the feature is located near a boundary of a divided range at the time of assignment, a supplementary code is added.

On the other hand, the enquiry video name is also produced from the code of a representative frame string. In response to specification of a pertinent frame image by the user, the enquiry video name is produced semiautomatically. In case there are a plurality of enquiry videos, an attribute name is added to each of said enquiry video names.

Video name matching is conducted when a representative frame image has been extracted. Furthermore, the matching is conducted only when a time length between representative frame images is within a predetermined range. Actual video name matching is conducted by comparing code strings. In case there is a supplementary code, the comparison is made while considering a possibility of a different code meant by the supplementary code.

Finally, the output result of matching includes at least one of time information, a video name and a video attribute name, on the successful matching.

In case the retrieval target is a video which is being broadcasted and a video to be matched is a commercial video including a plurality of scenes, the output of matching is at least one of broadcast time, a commercial name, and a sponsor name.

In case the retrieval target is a video in a data base, a representative frame image is extracted from a video when the video is stored on a storage medium. One feature or a plurality of features are calculated from a whole or a part of the frame. A corresponding code is assigned to the feature or each of the features. The frame image is provided with the code or a code string arranged in a predetermined order as a name thereof, and a video name for the video is produced in a form of a frame name string corresponding to a string of the frame. The video name is stored as index information, and the index information of the storage medium is matched with a string of names of videos prepared beforehand.

The apparatus for implementing the retrieval method heretofore described includes video inputting means, means for extracting a representative frame image of the video, means for calculating one feature or a plurality of features from a whole or a part of the frame image, means for assigning a corresponding code to the feature or each of the features, means for providing the frame image with the code or a code string arranged in a predetermined order as a name thereof, and producing a video name for the video in a form of a frame name string corresponding to a string of the frame, and means for matching the video name with the enquiry video names.

According to the above described method, representative frame images of the present invention are limited to head frame images at scene changes or frames inputted at predetermined intervals. Therefore, it is possible to prevent occurrence of a video name having a large number of characters including similar code strings. This results in an effect that the matching time can be shortened. Furthermore, matching based upon a name derived from the feature of the video is performed, and vide o retrieval is conducted as simple character string matching like text retrieval, resulting in high speed. Typically in conventional video matching, there is no alternative but to determine the degree of similarity on the basis of an evaluation function based upon numerical computation between features, and hence a long calculation time is required. In the present invention, that calculation becomes unnecessary at the time of matching. In principle, therefore, the present invention method is faster than the conventional method. Furthermore, the feature is a simple one calculated from a digitized image or time length between frames, and hence it can be calculated in real time. Code assignment is a simple one conducted by only assigning a code on the basis of which range the feature belongs to. The time required for assignment is thus short. As for codes, by assigning existing character codes, a general purpose mechanism for character string matching can be used. It thus becomes unnecessary to newly develop a special matching mechanism for video retrieval.

In case a feature has a value located near an adjacent code at the time of code assignment, a supplementary code is added to expand a permissible range at the time of matching. Therefore, deterioration of performance such as retrieval omission can be prevented.

On the other hand, in case there are a plurality of enquiry video names, attribute names of videos are added. By seeing the attribute name of a video, the user can easily know which of a plurality of enquiry videos has matched.

Video name matching is conducted only when a representative frame image has been extracted. And video name matching is conducted only when the time length between the frames is in a predetermined range. This results in an effect that the number of times of matching can be reduced.

The output result of matching includes at least one of time information, a video name and a video attribute name, on the successful matching. The user can easily collect and arrange video retrieval results afterwards.

In case the retrieval target is a video which is being broadcasted and a video to be matched is a commercial video including a plurality of scenes, at least one of broadcast time, a commercial name, and a sponsor name is outputted as the retrieval result. Therefore, statistical information linked with the number of times of broadcast of commercial messages for each kind and audience ratings at the time of broadcast can be automatically derived. In case the retrieval target is a video in a data base, calculation of the feature can be omitted at the time of retrieval by adding a frame name as index information beforehand and hence faster matching can be implemented.

An apparatus for implementing the retrieval method heretofore described includes video inputting means, means for extracting a representative frame, means for calculating a feature, means for assigning a code, means for producing a video name, and means for matching video names. Real time processing thereof can be implemented in general purpose work stations having video input function. Inexpensive video retrieval apparatuses can thus be implemented.

DESCRIPTION OF THE PREFERRED EMBODIMENTS

Hereafter, an embodiment of the present invention will be described by referring to drawings.

Figure 1:
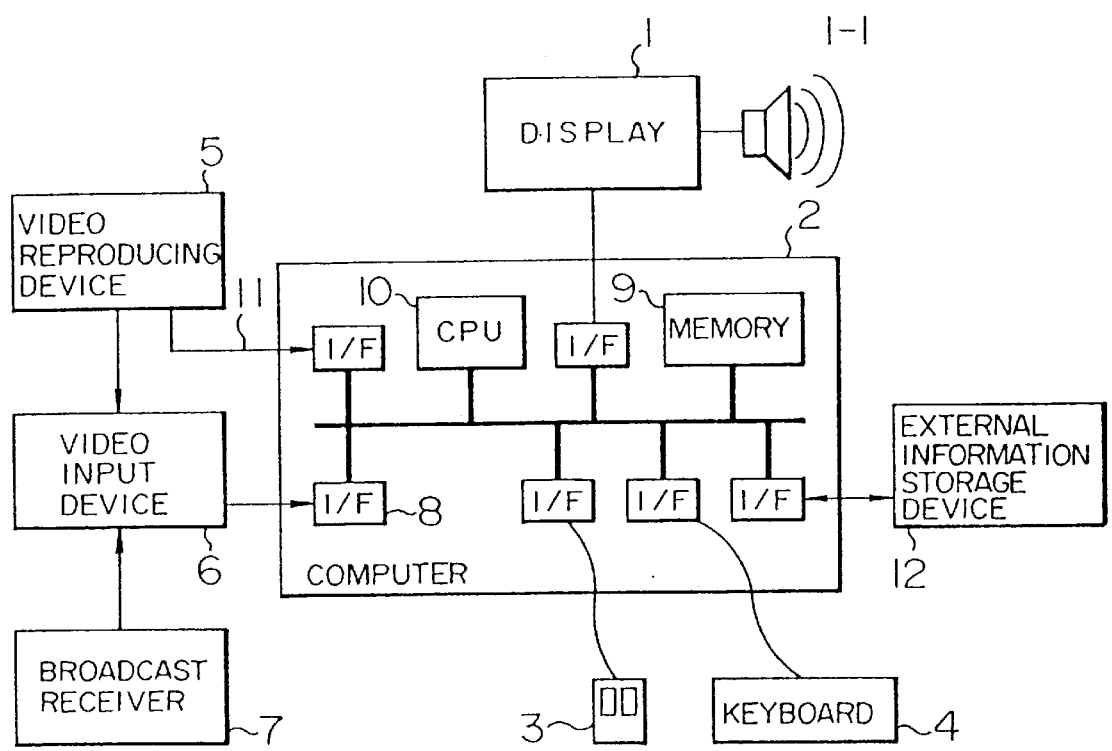
FIG. 1 is a schematic block diagram of a video retrieval system configuration in an embodiment of the present invention.

FIG. 1 is an example of a schematic block diagram of a system configuration for implementing the present invention. Numeral 1 denotes a display device such as a CRT for displaying an output screen of a computer 2. Instructions to the computer 2 can be given by using a pointing device 3 or a keyboard 4. A video reproducing device 5 is an optical disk or a video deck. Video signals outputted from the video reproducing device 5 are successively converted to digital image data by a video input device 6 and sent to the computer 2. When occasion demands, it is also possible to take in video images which are being broadcasted and a video signal fed from a broadcast receiver 7 is inputted to the video input device 6. Within the computer 2, digital image data are inputted to a memory 9 via an interface 8 and processed by a CPU 10 in accordance with a program stored in the memory 9. In case the video handled by the CPU 10 is being sent from the video reproducing device 5, frame images are provided with numbers (frame numbers) in order from the beginning of the video. By sending a frame number to the video reproducing device via a control line 11, the video of the pertinent scene is reproduced. In case of a video sent from the broadcast receiver 7, there are no frame numbers. As occasion demands in this case, therefore, a time when an image has been taken in is recorded and used instead of a frame number. Under the necessity of internal processing of the computer, various kinds of information can be stored in an external information storage device 12. In the memory 9, various data produced by processing described hereafter are stored. The various data stored in the memory 9 are referred to as occasion demands.

Figure 2:
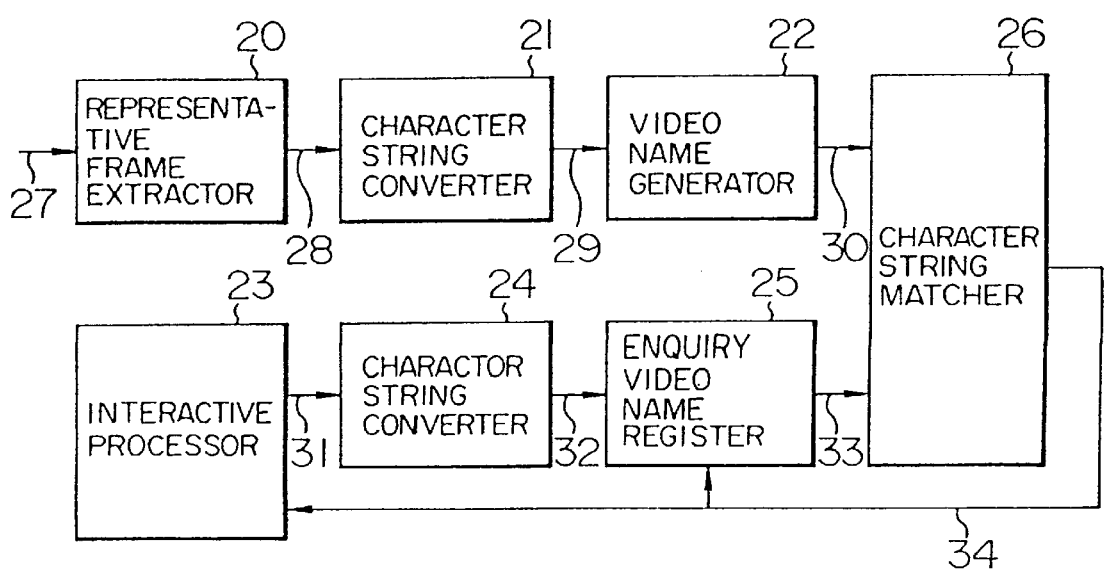
FIG. 2 is an entire block diagram of an embodiment of video retrieval processing according to the present invention.

FIG. 2 is an entire block diagram of an embodiment of video retrieval processing according to the present invention. The processing is executed within the computer 2. In accordance with the present invention, the target video is inputted frame by frame successively and stored temporarily in the memory 9. The representative frame extractor 20 detects a scene change from a frame image 27 stored in the memory 9 by referring to preceding and succeeding frame images and extracts a frame image 28 at the time of detection. The character string converter 21 converts the frame image 28 to a character code string 29 reflecting a feature of the frame image 28. The video name generator 22 successively stores the character code string sent from the character string converter 21 in a shift register having a fixed length. The character code string stored in the shift register corresponds to a frame image string forming the video, and the character code string is outputted as a video name 30.

On the other hand, the user conducts enquiry video registration, retrieval start order, and retrieval result confirmation in the interactive processor 23. In the same way as in the character string converter 21, a representative frame image 31 specified by the user is converted to a character code string 32 in the character string converter 24. The enquiry video name register 25 stores and administers character code strings 32 of a plurality of representative frame images as enquiry video names together with attributes. Attributes refer to information relating to a video such as the name of the producer of the video, date of production, place, characters, purpose, and action. These are inputted by the user via the interactive processor 23.

A plurality of enquiry video names can be registered. In the character string matcher 26, character codes forming the video name 30 successively generated from target frame images are matched with character codes forming each of a plurality of enquiry video names 33 registered in the enquiry video name register 25. If names are coincident, the retrieval is judged to be successful and a retrieval result 34 is outputted. The retrieval result is the attribute of the video successful in retrieval, and frame number successful in retrieval or time information successful in retrieval. The retrieval result 34 is returned to the interactive processor 23 and confirmed by the user.

Furthermore, the enquiry video name register 25 is informed of the retrieval result 34, and history information of retrieval is automatically updated.

In the present embodiment, the problem of matching a video with another video is replaced by the problem of matching a name with another name by giving names to videos in the character string converter. In the same way as text retrieval, the present embodiment has an effect that a video can be retrieved at high speed. In conventional matching of a video with another video, there is no alternative but to determine the degree of similarity on the basis of an evaluation function between features, resulting in a problem of long matching time. However, this problem has been solved by the present invention. Furthermore, by connecting character strings of a plurality of representative frames in series and finding coincidence in names of long character strings, matching of videos of many kinds can also be coped with.

Figure 3:
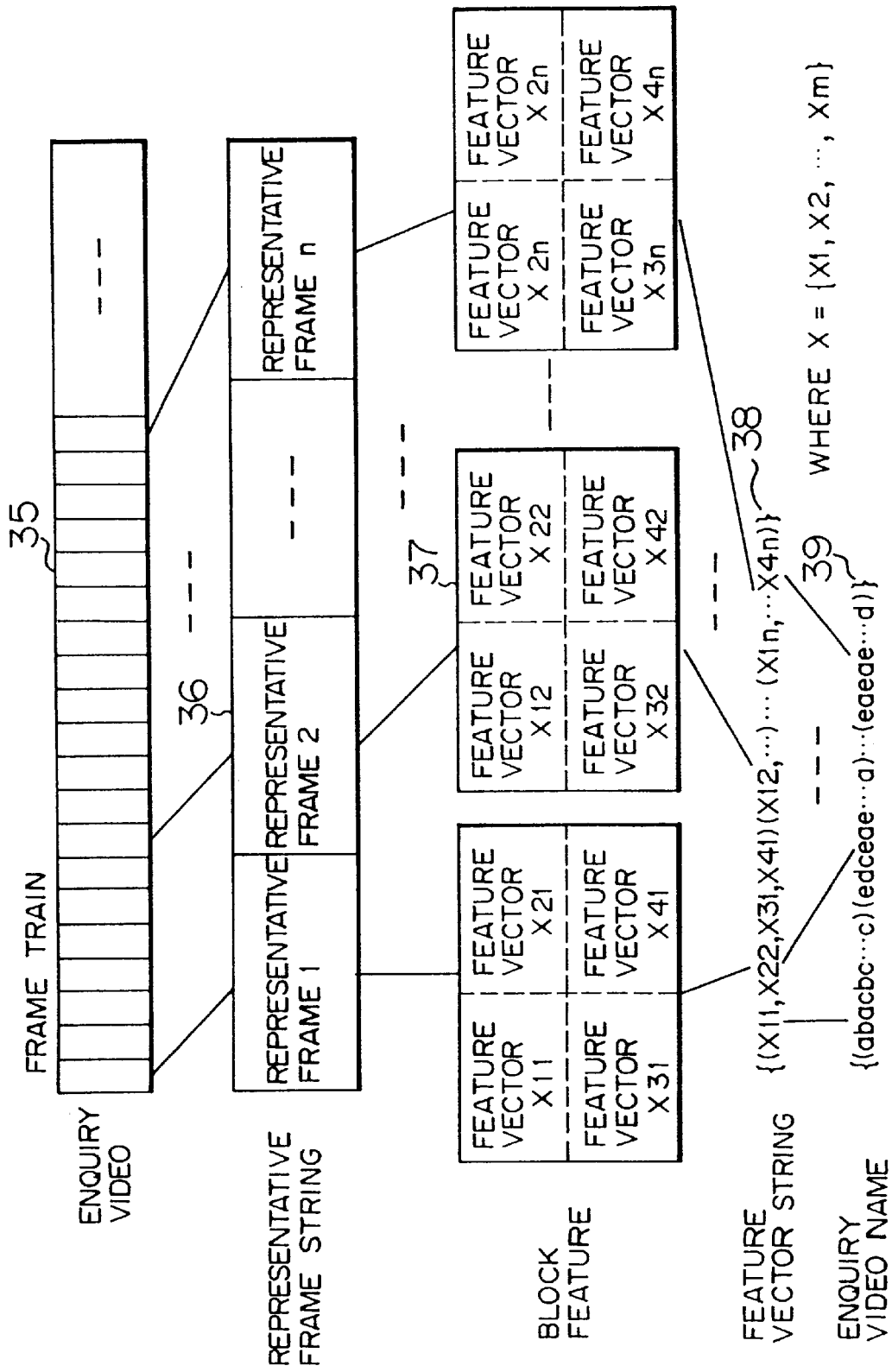
FIG. 3 is a diagram showing an embodiment of a video naming method using a character string.

FIG. 3 shows an embodiment of a video naming method. First of all, the user selects an enquiry video 35 having a certain length. Then the user specifies representative frame images 36 included in the enquiry video 35 by a required number of frames. Each frame image is divided into a plurality of blocks, and several features 37 are calculated therein to obtain a feature vector. Elements of the feature vector include the area of a specific color of the image, time length between representative frames, integrated value of sound intensity associated with the video, time length of sound having a fixed intensity or above, and average value of each RGB color element. Features other than those described here can be adopted so long as they describe features of the video and have resistance to noise. All of feature vectors derived in respective blocks are collected to form a feature vector string 38. An element area of each feature vector is divided into some sections. Depending on which section the value of an element falls in, the element is converted into an alphabetical character code assigned to the section. By replacing elements of all feature vectors by character codes and arranging them in a line, an enquiry video name 39 can be generated.

Although an image is divided into blocks in the present embodiment, it is a matter of course that the entire screen may form one block. By changing the number of blocks, the number of elements of a feature vector, and kinds of elements, for example, a retrieval purpose can be coped with flexibility. For example, it is possible to cope with a retrieval purpose of the user's choice such as retrieval of the same video, retrieval of a similar video, retrieval of a video having a coincident scenario tempo, retrieval of a video having a similar color configuration, or retrieval of a video having a coincident composition.

Figure 4:
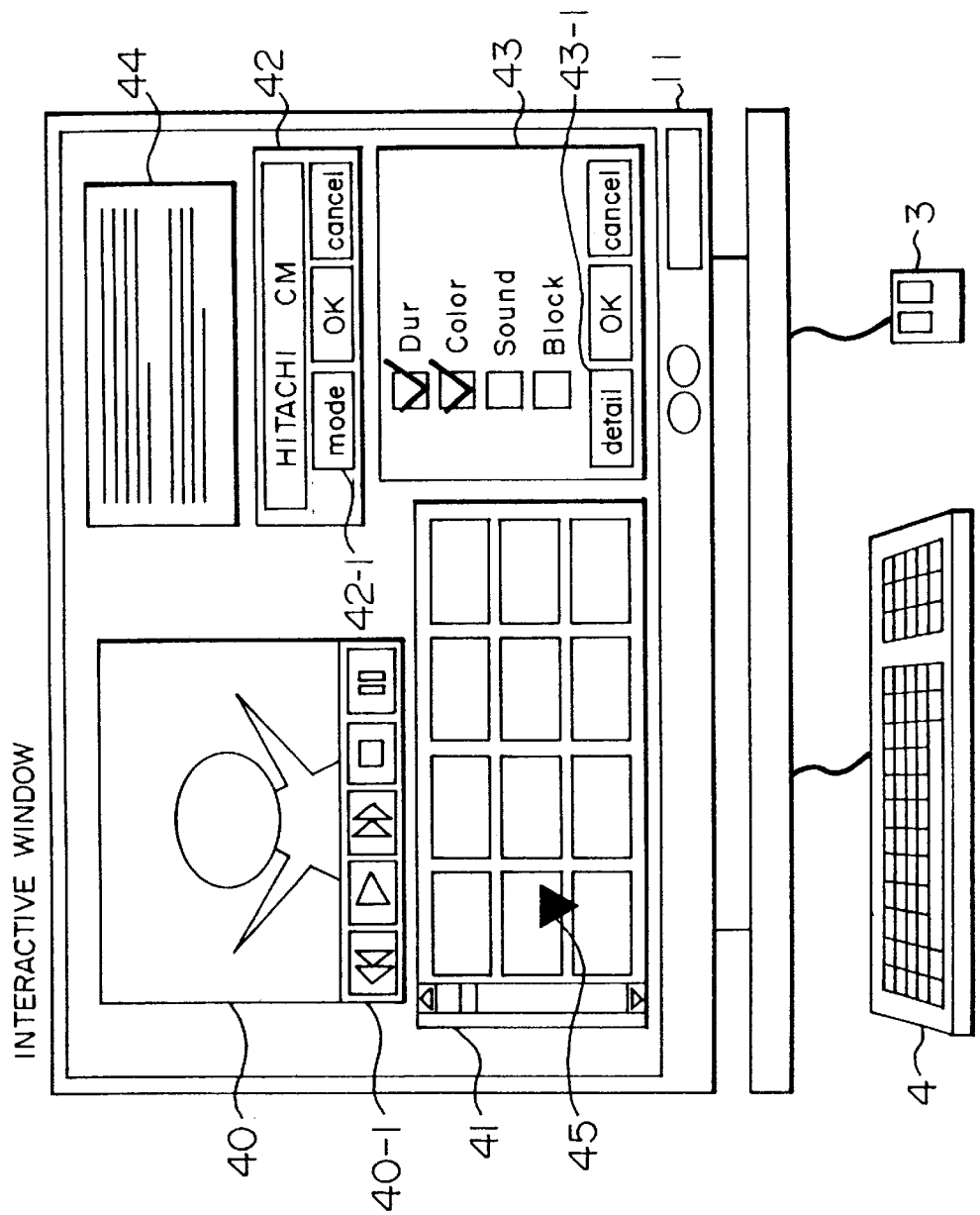
FIG. 4 is a diagram showing an embodiment of a display screen used for interaction with a user.
Figure 5:
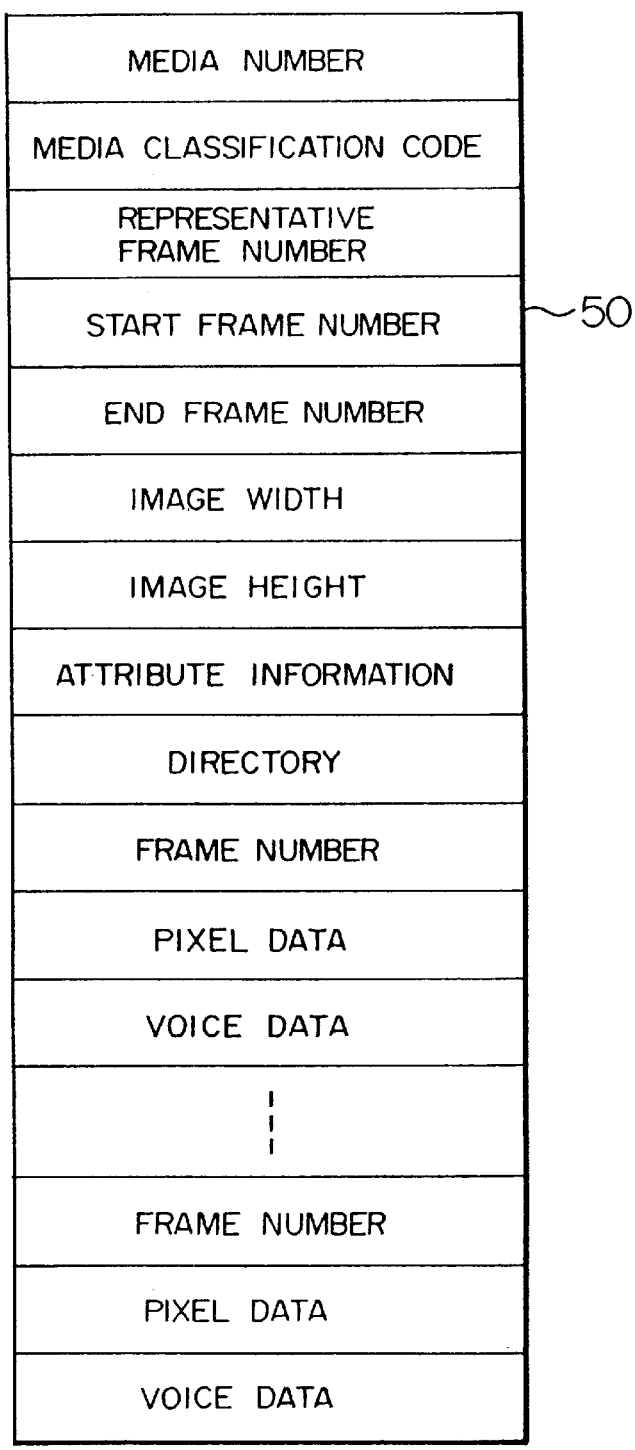
FIG. 5 is a diagram of a data structure of a digitized video.

FIG. 4 shows an embodiment of a display screen used for interaction with the user. A frame image of a video is reproduced and displayed on a monitor window 40 of a computer display. Besides the monitor window 40, windows displayed on the same screen includes a window 41 for displaying a list of extraction results of representative frame images, a text window 42 for inputting an attribute of an enquiry video, a window 43 for specifying the kind of a feature to be used at the time of retrieval, and a window 44 for displaying a result of retrieval. These windows can be moved to arbitrary positions by operating a cursor 45. The cursor 45 can be freely moved by using a mouse which is the pointing device 3. For inputting text, the keyboard 4 is used. A button 40-1 is a button for controlling the reproduction state of a video. By clicking the button 40-1 with the mouse, control such as video reproduction, fast forward, or rewind can be exercised. Furthermore, the scene to be reproduced can be selected by clicking a representative frame image included in the list displayed on the window 41. At that time, the video to be reproduced may be a video outputted from the video reproducing device 5 connected to the computer, or a digitized video registered in the external information storage device. In case of the video reproducing device 5, the frame number of the beginning of a scene is sent to the video reproducing device and reproduction is started from a scene corresponding to the frame number. When a frame number of the scene end is reached, an instruction for discontinuing the reproduction is sent to the video reproducing device 5. In case of a digitized video, video data corresponding to the frame number of the scene beginning are extracted from video data represented by a video data structure 50 shown in FIG. 5, for example, and displayed as graphic data. Sound data associated with image data are also stored in the video data structure 50 and may be outputted to a speaker 1-1. When display processing corresponding to one frame has been finished, display processing of the next frame is conducted in succession to display a moving picture. According to the time required for display processing, the number of frame images displayed to a fixed time is adjusted so that the video may not be traversed rather rapidly or rather slowly. In the monitor window 40, a video fed from the broadcast receiver 7 can also be displayed.

The operation procedure of the user for retrieving a video by using the screen of FIG. 4 will hereafter be described. In order to specify an enquiry video, the user first selects several representative frames arranged in the window 41 by clicking them with the mouse. In the text window 42, the user then inputs and registers attribute information, such as the title and character names, of the selected video via the keyboard. The number of registered information pieces is arbitrary. In the window 43, the user then specifies which and which of the time length, color, sound, the number of divided blocks and the like should be adopted as features to be used as the retrieval condition. In the window 43, "detail" button 43-1 is included. By clicking the "detail" button 43-1, a detail window is opened and a value region of a specified feature can be determined according to the user's choice. This operation is conducted only when there is a change request. Typically, retrieval is conducted by using features preset by the system. After the retrieval condition has been prepared, a retrieval range is specified. As for this operation, the kind of a video and a retrieval time zone can be specified by clicking "mode" button 42-1 included in the text window 42 and causing the retrieval range specifying mode. Finally, the user issues a retrieval start request. This is also conducted by clicking the "mode" button 42-1, causing the retrieval request mode, and clicking "OK" button 42-2. The system starts retrieval processing and displays the obtained result in the window 44. Displayed contents include attribute information and time information.

In the present embodiment, the user can specify an enquiry video by a simple operation using the mouse while seeing representative frames. Therefore, the work of converting a pattern feature to a keyword in detail becomes unnecessary. Furthermore, a feature such as the time length feature, sound feature, or color feature can be selected according to the user's choice, and wide application of retrieval can be coped with.

Figure 6:
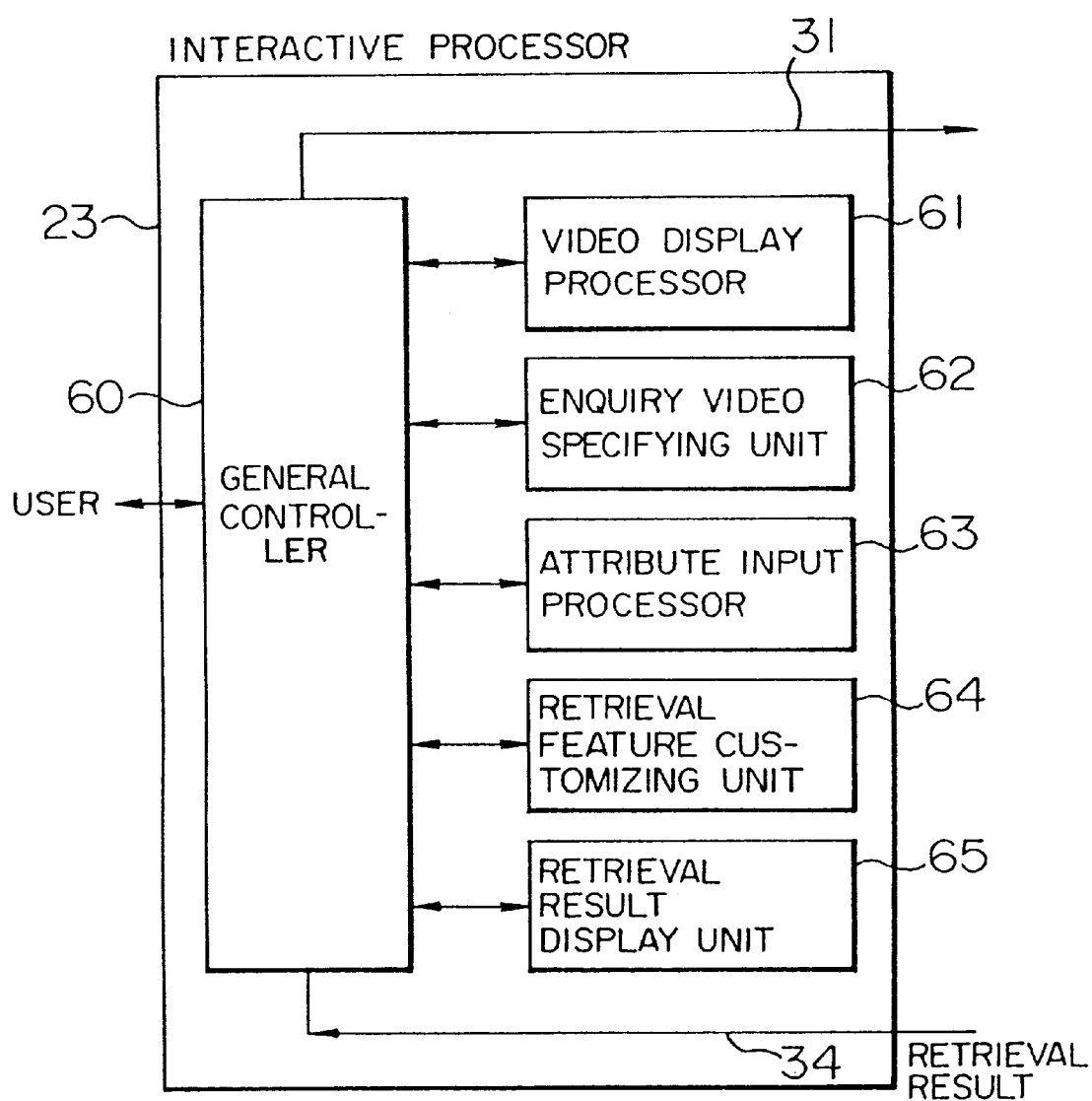
FIG. 6 is a diagram showing an embodiment of an interactive processor 23 illustrated in FIG. 2.

FIG. 6 shows an embodiment of the interactive processor 23 illustrated in FIG. 2. A general controller 60 exercises control over interaction with the user and controllers. The controllers include a video display processor 61, an enquiry video specifying unit 62, an attribute input processor 63, a retrieval feature customizing unit 64, and a retrieval result display unit 65. The video display processor 61 executes video reproduction in the monitor window 40. The enquiry video specifying unit 62 displays the list of representative frame images in the window 41 and outputs a digital image 31 of a representative frame selected with the mouse by the user. By using mode changeover, the attribute input processor 63 conducts three kinds of processing via the window 42. The first of them is processing of inputting the attribute of the enquiry video via the keyboard. The second of them is processing of setting the retrieval range. For example, the retrieval range is specified by a retrieval start frame number and an end frame number of the video reproducing device 5. In case the target of retrieval is a video of the broadcast receiver 7, the retrieval range is specified by a channel number, retrieval start time, and retrieval end time. The third of them is issuance of a retrieval start command. The retrieval feature customizing unit 64 designates a variable of feature using the retrieval via window 43. The retrieval result display unit 65 is supplied with the retrieval result 34 and displays it in the window 44.

Figure 7:
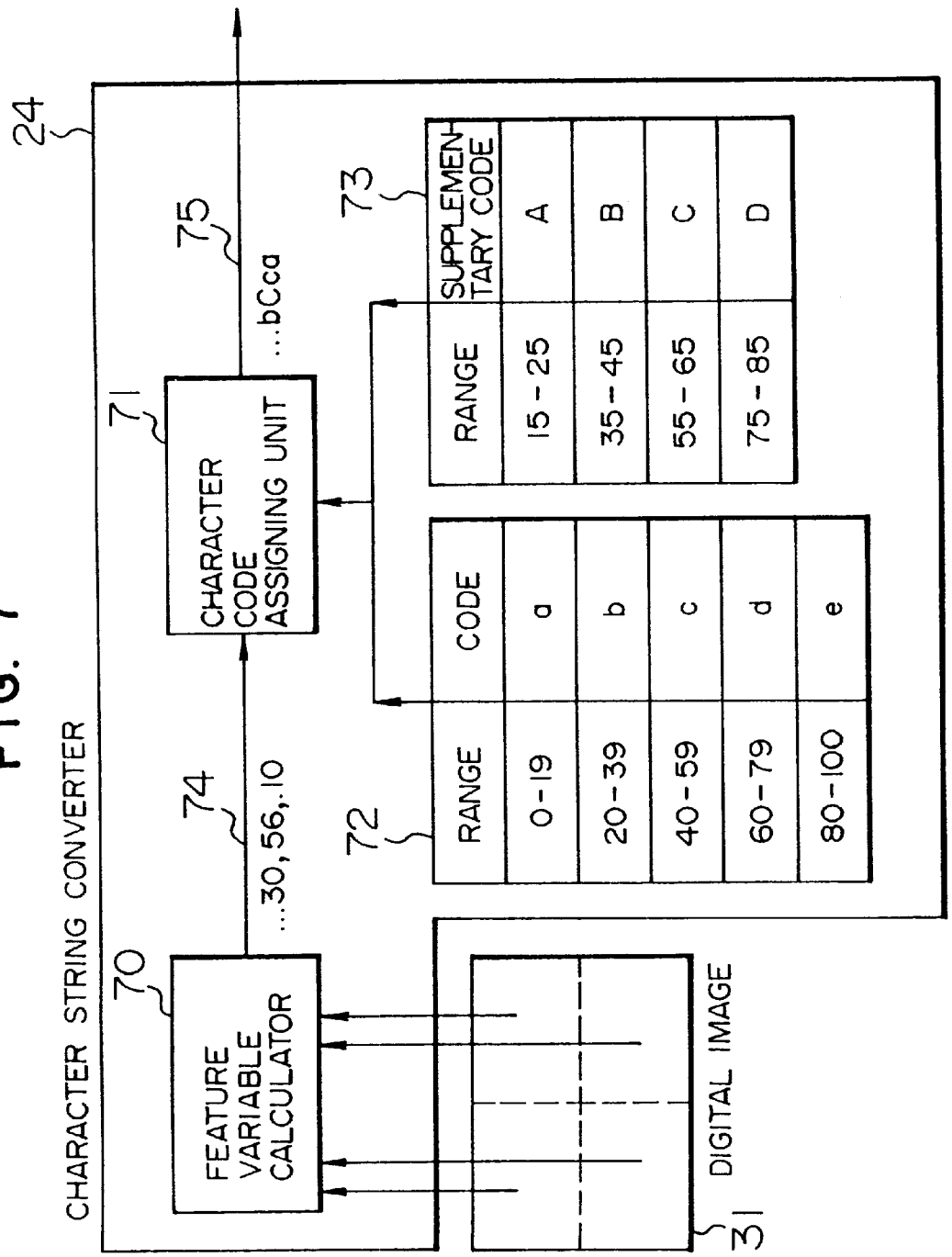
FIG. 7 is a diagram showing an embodiment of a character string converter 24 illustrated in FIG. 2.

FIG. 7 shows an embodiment of the character string converter 24 illustrated in FIG. 2. The digital image 31 sent from the interactive processor 23 is divided into blocks, and the feature calculator 70 calculates a feature vector. Elements of the feature vector are normalized so that each element will have a value ranging from 0 to 100, and the elements 74 are outputted. By referring to a character conversion table 72, a character code assigning unit 71 makes values of the elements 74 correspond to character codes and outputs character codes 75. When the value of an element 74 is not a value located near the center of a range of the character conversion table 72 but a value located near a boundary between adjacent ranges, the fact is reflected in the character code. A character conversion table 73 has the same configuration as the table 72 has. In the character conversion table 73, however, boundary ranges and supplementary codes corresponding to them are stored beforehand. For example, when an element has a value of 10, a character code "a" is assigned to the element by referring to the character conversion table 72 and outputted as the character code 75. Since in this case there is no pertinent range in the character conversion table 73, a supplementary code is not outputted. When an element has a value of 56, for example, a character code ice is outputted as the character code 75 in the same way. In this case, there is a pertinent range in the character conversion table 73 and a supplementary code "C" is outputted in succession.

When in this embodiment an element of a feature vector has a value located near a boundary between ranges for determining character codes, a supplementary code for informing of the fact is outputted. In case the character code of an element is aA, for example, therefore, the element can be interpreted as a or b even if a change due to a factor such as noise is caused. Stability at the time of matching is thus improved.

Figure 8:
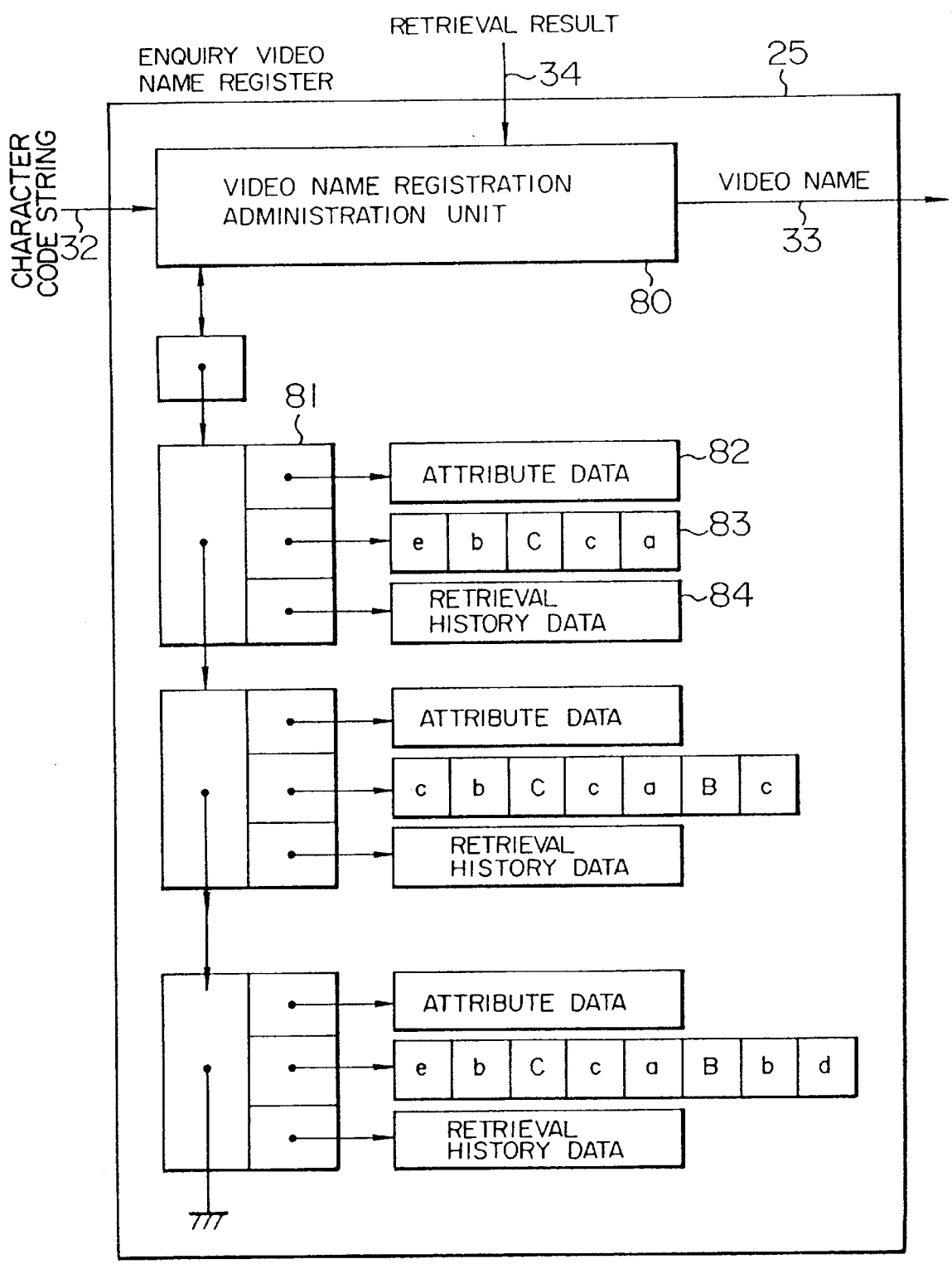
FIG. 8 is a diagram showing an embodiment of an enquiry video name register 25 illustrated in FIG. 2.

FIG. 8 shows an embodiment of the enquiry video name register 25 illustrated in FIG. 2. The character code string 32 is registered in a storage unit linked by a list 81 under the administration of a video name registration administration unit 80. The character string 32 as well as the attribute inputted to the interactive processor 23 by the user are stored as character string code data 83 and attribute data 82. At that time, retrieval history data 84 are initialized. As for the retrieval history data 84, registration of retrieval time and update of the number of retrieval times are conducted when the retrieval result 34 is inputted. The video name 33 for matching is successively read out from the character string code data 83 via the list 81 and outputted.

In this embodiment, matching of a plurality of enquiry videos is possible and retrieval history can be administered. Therefore, update processing of enquiry videos based upon occurrence frequency becomes possible. For example, enquiry videos which have not been updated at all are removed from the list, and the user newly conducts registration.

Figure 9:
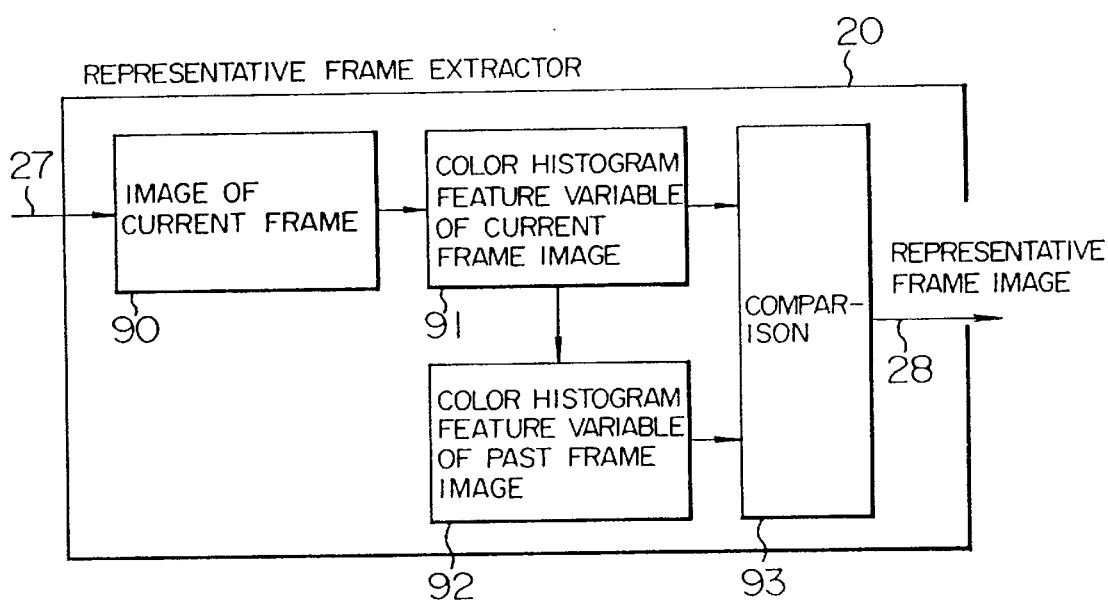
FIG. 9 is a diagram showing an embodiment of a representative frame extractor 20 illustrated in FIG. 2.

FIG. 9 shows an embodiment of the representative frame extractor 20 illustrated in FIG. 2. The representative frame extractor 20 automatically detects a scene change of the target input video 27 and outputs an image at that time as the representative frame image 28.

First of all, a color histogram feature 91 is derived from a frame image 90 currently taken in. It is compared with a color histogram feature 92 derived in the last frame by a comparator 93. If histogram features are similar, the same scene is judged to continue. Otherwise, a scene change is judged to have occurred. In case of a scene change, the image 90 is outputted as the representative frame image 28.

In this embodiment, a scene change can be automatically detected. In case a scene change does not occur for a long time, however, the image 90 may be outputted as the representative frame image 28 whenever a fixed time has elapsed.

The representative frame image 28 is converted to the character code 29 by the character string converter 21 while taking a frame as the unit. This character string converter 21 is the same as the character string converter 24 described with reference to FIG. 7 and hence description thereof will be omitted.

Figure 10:
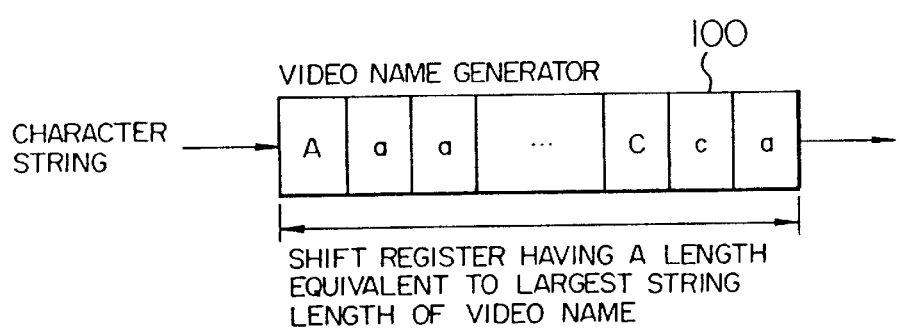
FIG. 10 is a diagram showing an embodiment of a video name generator 22 illustrated in FIG. 2.

FIG. 10 shows an embodiment of the video name generator 22 illustrated in FIG. 2. The character string code 29 sent in time series whenever a representative frame image is detected is inputted to a shift register 100 having a length capable of containing the largest number of characters included in enquiry video names while it is being successively shifted from the left to the right. In the shift register 100, a video name to be matched is always stored. In this case, the rightmost character of the video name is the head character. Contents of this shift register are outputted as the target video name 30.

Figure 11:
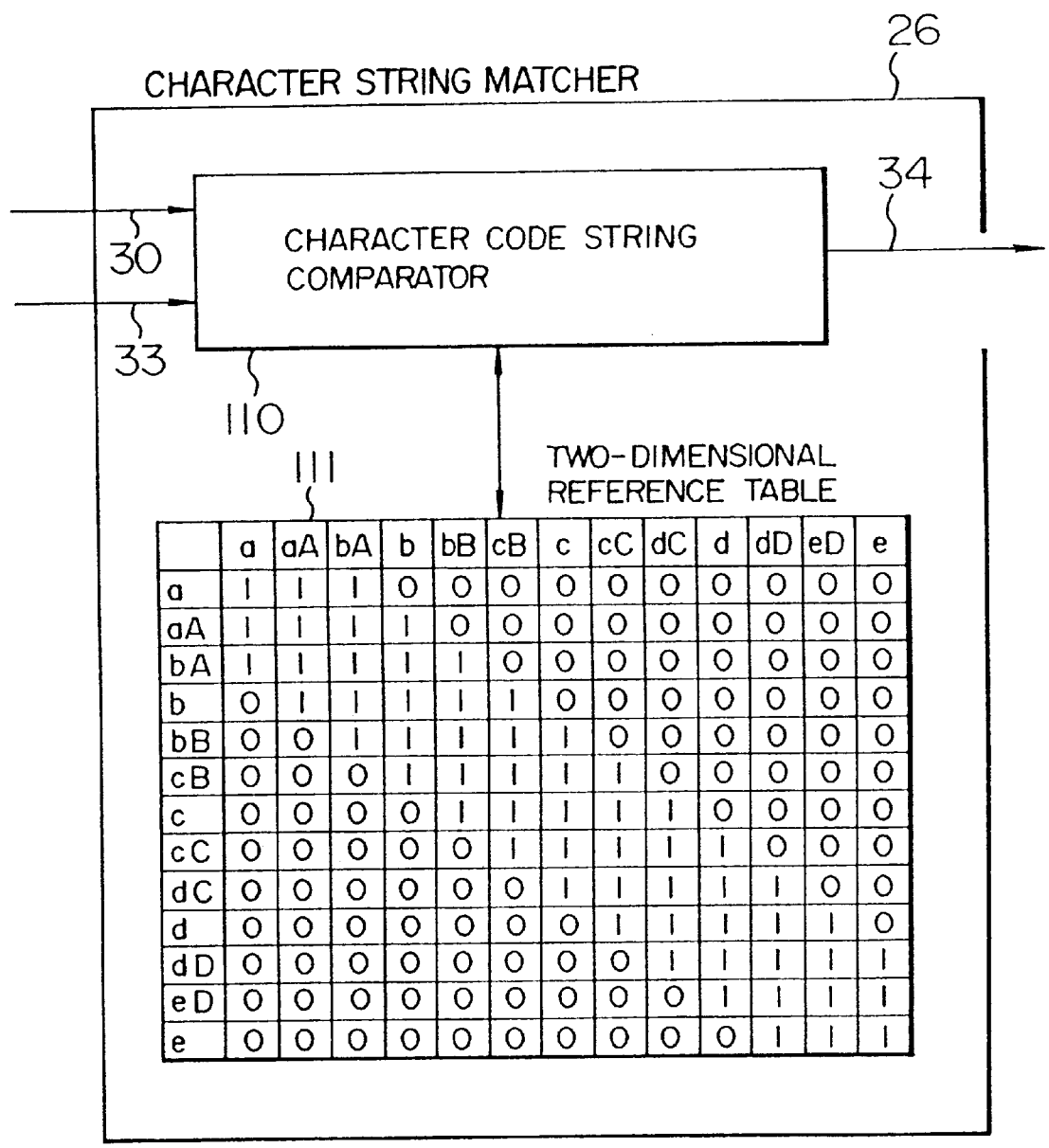
FIG. 11 is a diagram showing an embodiment of a character string matcher 25 illustrated in FIG. 2.

FIG. 11 shows an embodiment of the character string matcher 26 illustrated in FIG. 2. Operation of this character string matcher is conducted only when a representative frame is extracted. First of all, the target video name 30 and the enquiry video name 33 are inputted. They are compared in a character code string comparator to determine whether the names coincide with each other. For this comparison, a two-dimensional reference table 111 is used. The vertical axis of the table corresponds to a code including a supplementary code fed from the video name 30. The horizontal axis corresponds to a code including a supplementary code fed from the enquiry video name 33. If an intersection in the table has a value of "1", the intersection represents coincidence. If an intersection has a value of "0", the intersection represents noncoincidence. In case of coincidence, the next codes are taken out from 30 and 33 and compared successively. If all codes forming the enquiry video name are coincident, the video retrieval has been successful and the retrieval result 34 is outputted. And matching of remaining enquiry video names is discontinued. On the other hand, if code noncoincidence is detected, processing proceeds to matching of the next enquiry video name at that time.

According to this embodiment, the two-dimensional reference table 111 is used for code coincidence detection and comparison of character codes having supplementary codes can be made at high speed. Furthermore, at the time when noncoincidence has been detected, matching is discontinued and processing proceeds to matching of the next enquiry video name. Even if the number of enquiry videos is large, therefore, matching can be performed at high speed. For example, even if all commercial messages of a video which is being broadcasted are to be retrieved, matching in real time becomes possible.

In case the retrieval subject is a video which is being broadcasted and the video to be matched is a commercial video including a plurality of scenes, it is a matter of course that the broadcast time, commercial name, and sponsor name can be outputted as the retrieval result by referring to the attribute of the list of the enquiry video name register.

Figure 12:
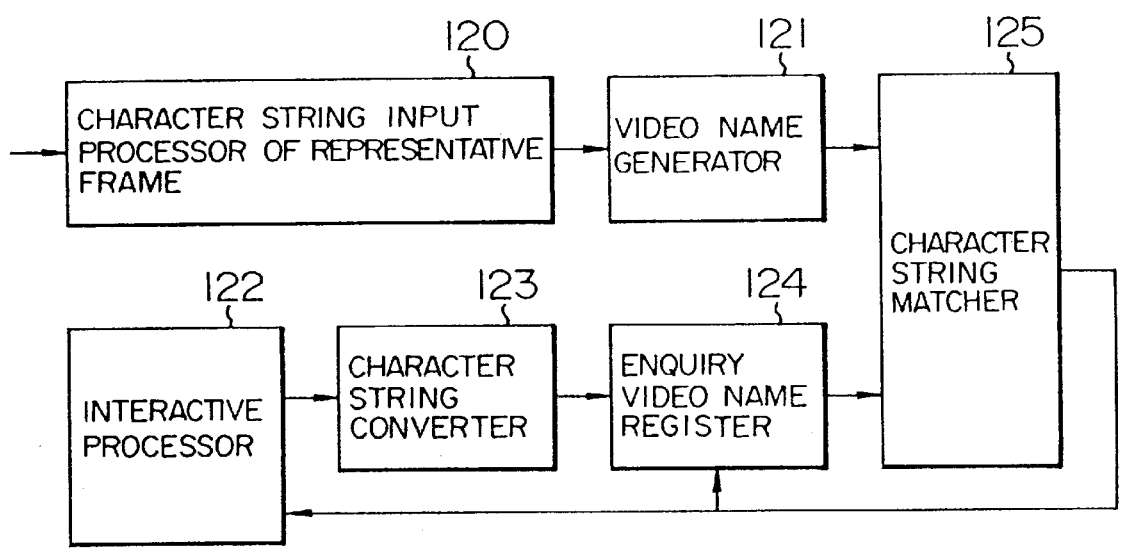
FIG. 12 is an entire block diagram of another embodiment of video retrieval processing according to the present invention.

FIG. 12 is an entire block diagram of another embodiment of video retrieval processing according to the present invention. It is executed within the computer 2. Although the embodiment of video retrieval processing shown in FIG. 2 can also be executed at high speed, real time processing, i.e., the speed of 30 frames per second is the limit. An embodiment for exceeding the limit is shown in FIG. 12. The embodiment of FIG. 12 is different from that of FIG. 2 in that the representative frame extractor 20 and the character string converter 21 of FIG. 2 are eliminated and a character string input processor 120 of representative frame is installed instead. All that the character string input processor 120 does is to receive a character string of a representative frame of the target video stored beforehand in the external information storage device 12 as an index and send it to a video name generator 121. Assuming now that the transfer speed of a magnetic disk in a work station is 10 Mbytes/second, for example, and the number of bytes of character strings per representative frame is 10 bytes, one million representative frames can be inputted in one second. Since representative frames of a video have scene changes at an average rate of once every five seconds, eventually the video is inputted at a reproduction speed increased by five million times. The actual speed depends on the processing in the character string matcher 125. When there are 1000 enquiry videos, matching of ten thousand bytes occurs in the worst case. If it is assumed that matching of one million bytes requires one second according to the speed of the work station, however, the above described matching can be executed in $\frac{1}{100}$ second. Therefore, the method of providing an index according to the present invention eventually brings about an effect equivalent to video retrieval at a reproduction speed increased by 500 times. Furthermore, by extracting a character string pattern having a high occurrence frequency out of character string patterns of representative frames forming indexes of the target video, know-how of video production of experts can be acquired.

The present invention can also be incorporated into video reproducing devices and television sets each having a video reproducing device.

According to the present invention, matching based upon character strings led from features of videos is performed. This brings about an effect that video retrieval can be performed at high speed as in text retrieval. Furthermore, the feature is simple one calculated from a digitized image or time length between frames. This results in an effect that the feature can be calculated in real time of video reproduction. In addition, by calculating and storing them in the external information storage device beforehand, processing can be advantageously conducted at a speed higher than the real time of video reproduction. Furthermore, in the present invention, the user can specify an enquiry video with the mouse while seeing representative frame images. Since the user can specify an enquiry video by such a simple operation, the work for converting the feature of the pattern to keywords advantageously becomes unnecessary. Furthermore, by extracting a character string pattern having high occurrence frequency on the basis of the index of the target video, know-how of video production of experts can be acquired. Furthermore, the present invention makes it possible to implement real time processing in general purpose work station systems having video input function. This results in an effect that inexpensive video retrieval apparatuses can be implemented.

What is claimed is:

1. A method of characterizing a video comprising the steps of:
    extracting frame images from an input video;
    calculating a feature of each of the frame images;
    assigning index information determined by the calculated feature to each of the frame images;
    stringing together the index information assigned to the frame images; and
    characterizing the input video by the strung-together index information.

2. A method according to claim 1, wherein the feature of each of the frame images includes color information of the frame image.

3. A method according to claim 1, wherein the frame images include head frame images located at scene changes of the input video.

4. A method according to claim 1, wherein the step of calculating a feature of each of the frame images includes the steps of:

dividing each of the frame images into a plurality of blocks; and calculating a feature of each of the blocks.

5. A method according to claim 1, wherein the input video is being broadcasted or is included in a data base.

6. An apparatus for characterizing a video comprising:

an extractor which extracts frame images from an input video;

a calculator which calculates a feature of each of the frame images;

an index information assigner which assigns index information determined by the calculated feature to each of the frame images;

an index information stringer which strings together the index information assigned to the frame images; and a characterizer which characterizes the input video by the strung-together index information.

7. An apparatus according to claim 6, wherein the feature of each of the frame images includes color information of the frame image.

8. An apparatus according to claim 6, wherein the frame images include head frame images located at scene changes of the input video.

9. An apparatus according to claim 6, wherein the calculator includes:

a unit which divides each of the frame images into a plurality of blocks; and a unit which calculates a feature of each of the blocks.

10. An apparatus according to claim 6, wherein the input video is being broadcasted or is included in a data base.

11. A computer program for characterizing a video, the computer program being stored by a computer-readable medium and, when executed by a computer, performing the steps of:

extracting frame images from an input video;

calculating a feature of each of the frame images;

assigning index information determined by the calculated feature to each of the frame images;

stringing together the index information assigned to the frame images; and characterizing the input video by the strung-together index information.

12. A computer program according to claim 11, wherein the feature of each of the frame images includes color information of the frame image.

13. A computer program according to claim 11, wherein the frame images include head frame images located at scene changes of the input video.

14. A computer program according to claim 11, wherein the step of calculating a feature of each of the frame images includes the steps of:

dividing each of the frame images into a plurality of blocks; and calculating a feature of each of the blocks.

15. A computer program according to claim 11, wherein the input video is being broadcasted or is included in a data base.

* * * * *